US008085621B2

(12) United States Patent
Massa

(10) Patent No.: US 8,085,621 B2
(45) Date of Patent: Dec. 27, 2011

(54) ULTRASONIC TRANSDUCER WITH IMPROVED METHOD OF BEAM ANGLE CONTROL

(75) Inventor: Donald Patrick Massa, Scituate, MA (US)

(73) Assignee: Massa Products Corporation, Hingham, MS (US)

( * ) Notice: Subject to any disclaimer, the term of this patent is extended or adjusted under 35 U.S.C. 154(b) by 350 days.

(21) Appl. No.: 12/460,790

(22) Filed: Jul. 24, 2009

(65) Prior Publication Data

US 2010/0020646 A1   Jan. 28, 2010

(51) Int. Cl.
   *H04R 17/00*   (2006.01)
(52) U.S. Cl. .................................................. 367/138
(58) Field of Classification Search .............. 367/162, 367/103, 138
   See application file for complete search history.

(56) References Cited

U.S. PATENT DOCUMENTS

| | | | | | |
|---|---|---|---|---|---|
| 3,928,777 | A | * | 12/1975 | Massa | 367/152 |
| 4,011,473 | A | * | 3/1977 | Massa | 310/335 |
| 5,057,182 | A | * | 10/1991 | Wuchinich | 310/325 |
| 5,171,387 | A | * | 12/1992 | Wuchinich | 156/73.3 |
| 5,719,823 | A | * | 2/1998 | Earp | 367/138 |
| 2010/0020646 | A1 | * | 1/2010 | Massa | 367/162 |
| 2010/0208553 | A1 | * | 8/2010 | Massa | 367/140 |

* cited by examiner

*Primary Examiner* — Daniel Pihulic

(57) ABSTRACT

An ultrasonic transducer utilizes an acoustic transmission line to increase the sensitivity of both the transmitting response and the receiving response. The resonant element of the transducer could employ a ceramic disc operating in the radial resonance mode for its transduction means, or it could be a half wavelength resonator utilizing a forward transmission line, a rear transmission line, and a non-resonant ceramic for transduction. The shape of the forward transmission line is designed to generate the desired acoustic radiation pattern at the frequency of resonance, which could be a broad or narrow conical beam or a fan shaped beam. A sealed housing structure is disclosed that contains the forward transmission line that is acoustically disconnected from the rest of the housing. This housing provides improved environmental protection and allows for easy mounting of the transducer without effecting its electroacoustic response characteristics.

18 Claims, 3 Drawing Sheets

Relative Horizontal Radiation Pattern at $f_L$

Relative Vertical Radiation Pattern at $f_L$

ULTRASONIC TRANSDUCER WITH IMPROVED METHOD OF BEAM ANGLE CONTROL

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention is concerned with electroacoustic transducers and, more specifically, with electroacoustic transducers for transmitting or receiving sound in a fluid medium. Although not limited to the ultrasonic frequency region, this improving the performance characteristics of electroacoustic transducers to be used in the ultrasonic frequency region in a gaseous medium.

The teachings of this invention can be used by one skilled in the art in a wide variety of transducer designs using many different methods of transduction for sound radiation or reception in fluid or gaseous mediums. Transducers using the teachings of this invention can be designed using a wide variety of transduction materials, such as magnetostrictive rods, piezoelectric crystals, and polarized ceramic elements. However, the teachings of this invention can be best used in conjunction with ultrasonic transducers designed with polarized ceramics for use in a gaseous medium. Such a transducer is described in U.S. Pat. No. 3,928,777.

U.S. Pat. No. 3,928,777 described an ultrasonic transducer employing a ceramic disc as the transduction material. For optimum performance, the transducer is operated in the vicinity of resonance. This disc could operate in the thickness mode of resonance, but in the preferred embodiment the ceramic disc operates in the radial mode of resonance, since a transducer of this design is smaller and less costly. The transducer further employs a novel acoustic transformer in the form of an acoustic impedance matching material inserted between the ceramic and the gaseous medium. This acoustic transformer material is characterized in that its acoustic impedance is less than the acoustic impedance of the ceramic, but greater than the acoustic impedance of the gaseous medium. The acoustic impedance of a material is its density, $\rho$, times the velocity of sound, c, in the material. In addition, the thickness of the acoustic transformer material is approximately one quarter of a wavelength.

As shown in the referenced patent, a transducer utilizing the teachings of that invention will produce significant increase in sensitivity over a broader frequency response, and the resultant acoustic radiation pattern will invention is particularly useful for contain reduced secondary lobes. However, the beam angle from the transducer is fixed and controlled at the resonant frequency by the diameter of the ceramic disc. To overcome that limitation, this invention provides a novel design of an acoustic transformer with dimensions that are not the same as the dimensions of the ceramic disc. This acoustic transformer can therefore be designed to produce a wide variety of different acoustic radiation patterns. These radiation patterns can be conical in shape with different beam angles, or they can be fan shaped containing one beam angle in the horizontal plane and a different beam angle in the vertical plane. The transducer can also be designed to utilize a plastic housing that provides improved environmental protection.

BRIEF SUMMARY OF THE INVENTION

The primary object of this invention is to provide an acoustic transmission line between the vibrating surface of the transduction material and the medium into which the vibrations are to be transmitted, with the dimensions of the transmission line designed to create an acoustic radiating pattern that has a desired beam angle.

Another object of this invention is to produce an acoustic radiation pattern that is fan shaped containing one beam angle in the horizontal plane and a different beam angle in the vertical plane.

An additional object of this invention is to provide an acoustic transmission line that is part of a transducer resonant structure that is a half wavelength in length.

A still further object of this invention is to provide a means of housing the transducer structure, where a portion of the housing structure is part of the acoustic transmission line, but this radiating portion of the housing is acoustically disconnected from the rest of the housing.

Another object of this invention is to provide improved environmental protection for the transducer by utilizing a sealed housing.

BRIEF DESCRIPTION OF THE DRAWINGS

The novel features which are characteristic of the invention are set forth with particularity in the appended claims. However, the invention itself, both as to its organization and method of operating, together with further objects and advantage thereof, will best be understood by reference to the description when taken in conjunction with the accompanying drawings in which:

DETAILED DESCRIPTION OF THE INVENTION

Figure 1:
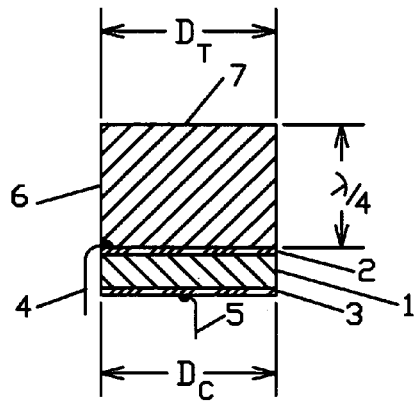
FIG. 1 is a schematic cross-sectional representation of a cylindrical transducer resonant element using a thin radial resonant ceramic disc for the transduction material with an acoustic transmission line that radiates sound into the medium that has a diameter that is equal to the diameter of the ceramic disc.

Referring more particularly to the figures, FIG. 1 shows a schematic cross-section of a representation of a cylindrical resonant element of a transducer that uses the teachings of U.S. Pat. No. 3,928,777. The transduction material consists of a thin piezoelectric ceramic disc 1, which may be any one of the well known polarized ceramic materials such as, for example, lead-zirconate-titanate or barium titanate. The flat surfaces of the ceramic disc 1 are coated with metallic electrodes 2 and 3. They could be silver, electroless nickel, or other material as well known in the art. The ceramic disc 1 will resonate in the radial mode, also called the planar mode, and the frequency of the radial resonance, $f_R$, will be inversely proportional to its diameter, $D_C$, as is also well known in the art. To keep the thickness resonant frequency of the ceramic from interfering with the transducer operating at $f_R$, the thickness of ceramic disc 1 must be kept small enough so that the frequency of the thickness resonance of the ceramic is much higher than the frequency of the radial resonance. Electrical lead 4 is attached to electrode surface 2. This connection could be made using solder, electrically conducting cement, or any other means well known in the art. Electrical lead 5 is similarly connected to electrode surface 3.

A cylindrical acoustic transmission line 6 is attached to the front of ceramic disc 1. This attachment can be by any method that produces a strong mechanical bond, such as vulcanizing or cement. In the resonant element embodiment of FIG. 1, this transmission line 6 can be made of a wide variety of materials, such as potting compounds, rubbers, or plastics, but it is important that its specific acoustic impedance is greater than the specific acoustic impedance of the fluid or gas transmission medium into which the sound is to radiate, and less than the specific acoustic impedance of the ceramic material. The specific acoustic impedance is defined as the product of its density times the velocity of sound in the material. As was described in U.S. Pat. No. 3,928,777, the length of the transmission line 6 should be a quarter wavelength, $\lambda/4$, at frequency $f_R$, where for this structure $\lambda$ is the wavelength of sound in the transmission line material.

When an electrical voltage is applied across the electrical leads 4 and 5 at a frequency equal to the radial resonant frequency, $f_R$, of the ceramic disc 1, electrode surfaces 2 and 3 will alternately move towards each other and away from each other with maximum amplitude at that same frequency. The quarter wavelength transmission line 6 will then amplify the magnitude of the vibration that occurs at its surface that is attached to the front of electrode 2 of ceramic disc 1 and produce a much larger magnitude of vibration at its opposite surface 7. This larger vibration of surface 7 will then radiate the sound from the transducer into the transmission medium at a higher sound pressure than would be produced by the ceramic radiating into the transmission medium by itself. Because the transducer is reciprocal, the same increase in sensitivity is obtained when the transducer is used as a receiver. The response magnitude and Q of the transducer can be changed by using materials with different properties for the transmission line. If the material has greater internal mechanical losses, it will produce a transducer with a lower Q and lower sensitivity.

It is often desirable to design transducers to produce different acoustic radiation patterns. A transducer could be designed so that the radiation pattern of the sound it produces is omni-directional, or it could be designed to produce higher levels of sound pressure in a particular direction, usually perpendicular to the vibrating surface. This lobe of high sound pressure output can be made very broad, very narrow, or anywhere in between. The beam angle of the acoustic radiation pattern produced by a transducer is defined as the angle subtended by the two points on the lobe where the sound pressure radiated is 3 dB lower than the maximum level of the lobe. The beam angle at any specific frequency is a function of the dimensions of the radiating surface divided by the wavelength of sound in the transmission medium, $\lambda_M$, at that frequency. A transducer with a circular radiating surface with a diameter D will produce a conical acoustic radiation pattern. The beam angle of the conical pattern is inversely proportional to the ratio $D/\lambda_M$. Therefore, for a given frequency the beam angle will decrease as the diameter increases.

The radiating surface of the resonant element shown in FIG. 1 is surface 7 of the transmission line 6. This radiating surface is circular and has a diameter equal to $D_T$, which is also equal to the diameter of the ceramic, $D_C$. Since the radial resonant frequency, $f_R$, of the ceramic is inversely proportional to the diameter of the ceramic, $D_C$, and since $D_T$ is equal to $D_C$, both diameters will increase as the frequency $f_R$ decreases, but $\lambda_M$ will also increase by the same proportion as the frequency decreases. Therefore, the ratio of $D_T/\lambda_M$ will stay the same for an element that is designed to resonate at any frequency, provided it uses the same ceramic material and radiates into the same transmission medium. The radiation patterns for all resonant frequencies will be conical with the same beam angles. It was shown in U.S. Pat. No. 3,928,777 that for the range of the most common types of ceramic materials, the beam angle of the transducer radiating into air will be between approximately 8° to 12° at the radial resonant frequency of the ceramic discs.

Figure 3:
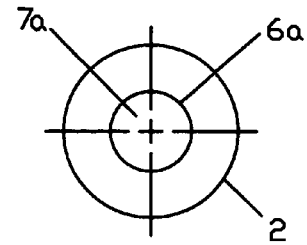
FIG. 3 is a top view of the structure shown in FIG. 2.
Figure 2:
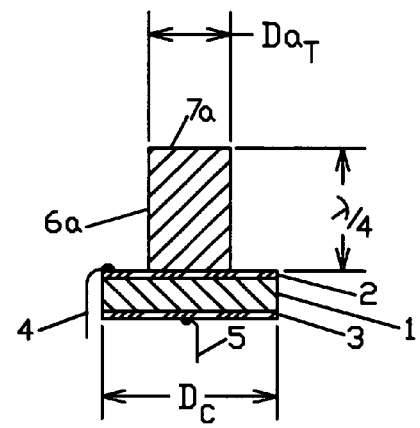
FIG. 2 is a schematic cross-sectional representation showing the radial resonant structure of FIG. 1, except the diameter of the acoustic transmission line that radiates sound into the medium is smaller than the diameter of the radial resonant disc, therefore producing a conical radiation pattern with a larger beam angle.

It is possible to change the radiation pattern at its resonant frequency of a transducer using a resonant element similar to the structure illustrated in FIG. 1. FIG. 2 shows a schematic cross-sectional representation of a modification of the transducer resonant element of FIG. 1 that would change the beam angle of the transducer. FIG. 3 is a top view of the structure shown in FIG. 2. This structure contains the same ceramic disc that was used in the resonant element of FIG. 1; therefore, the diameter of the ceramic disc 1, $D_C$, is the same for both. The length of the transmission line 6a of FIGS. 2 and 3 is a quarter wavelength long at $f_R$ and is also approximately the same as the length of transmission line 6 of FIG. 1. The diameter of the transmission line 6a, $Da_T$, however, is less than the diameter of the transmission line 6, $D_T$, of FIG. 1.

Figure 4:
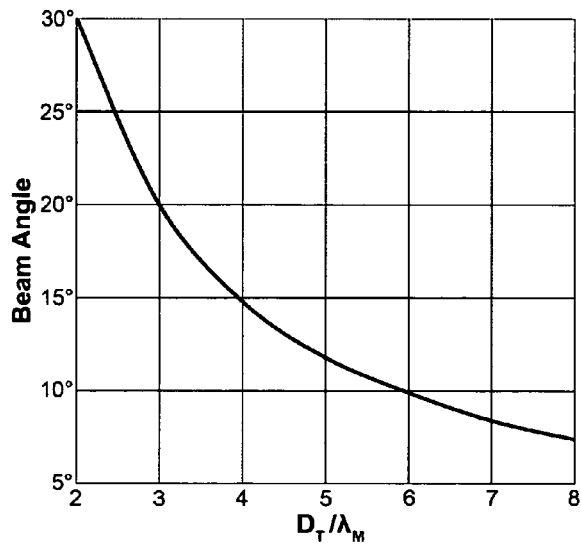
FIG. 4 is a plot showing how the beam angle of the acoustic radiation pattern changes as a function of the dimension of the diameter of the acoustic transmission line radiator divided by the wavelength of the sound in the medium.

Since the ceramic disc is the same for both structures, the radial resonant frequency $f_R$ is the same and $\lambda_M$ is the same. Because the diameter of the transmission line is decreased, the ratio $D_T/\lambda_M$ also decreases, and the beam angle of the conical acoustic radiation pattern of the transducer therefore increases. FIG. 4 shows a plot of the beam angle of the acoustic radiation pattern produced by a transducer as a function of $D_T/\lambda_M$.

By changing the diameter of the transmission line 6a of FIGS. 2 and 3, it is therefore possible for one skilled in the art to fabricate transducers that use the same ceramic disc 1 in their resonant elements, and operate at the same resonant frequency, $f_R$, but produce different conical beam angles. To obtain the desired beam angle, the diameter of the transmission line 6a is adjusted to produce the required value of $D_T/\lambda_M$ shown in the graph of FIG. 4.

For some applications it is often desirable to make the resonant element of the transducer a half wavelength resonator. This type of device produces a single clean resonance with one resonant frequency and one anti-resonant frequency. In the transducer resonant elements of FIGS. 1, 2, and 3, the radial resonance of the ceramic produce one resonant frequency and one anti-resonant frequency; however, the quarter wavelength resonance of the transmission line 6 is superimposed onto the resonant frequency of the ceramic. These two different resonant frequencies in the resonant element can change at different rates as the temperature of the transducer is changed. This is not the case with a half wavelength element. Half wavelength transducers are therefore more temperature stable and consistent, and their electroacoustic responses are more immune to degradation if dirt or other material attaches to the radiating surface.

Figure 5:
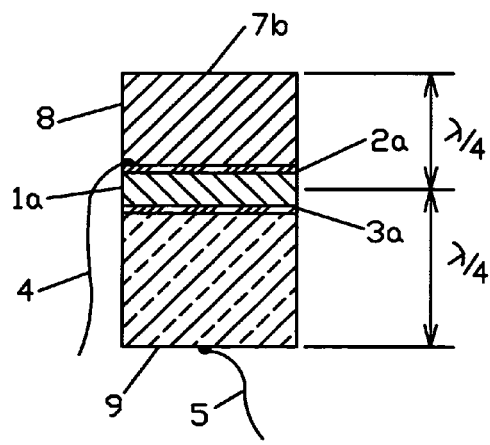
FIG. 5 is a schematic cross sectional representation of a cylindrical transducer resonant element that is a half wavelength resonator, which uses a thin non-resonant ceramic disc as the transduction material with an acoustic transmission line that radiates sound into the medium that has a diameter that is equal to the diameter of the ceramic disc.

FIG. 5 shows a schematic cross-section of a representation of one preferred embodiment of a cylindrical resonant element that uses a half wavelength resonator. The thin ceramic disc 1a has a radial resonant frequency and a thickness resonant frequency that are both higher than the half wavelength resonant frequency of the transducer element. Two cylindrical acoustic transmission lines are used in the structure, the forward transmission line 8 and the rear transmission line 9. When designing half wavelength resonating structures such as this, a wide variety of materials can be used for the two transmission lines. Different materials will produce transducers with different characteristics, such as different Qs, different sensitivities, different maximum stresses, different front to back vibration ratios, and different temperature responses. The resonant element is designed to operate at the frequency of half wavelength length resonance, $f_L$. To accomplish this, the length of the forward transmission line 8 plus half of the thickness of the ceramic disc 1a is designed to be a quarter of a wavelength long at $f_L$, and the length of the rear transmission line 9 plus half the thickness of the ceramic disc 1a is also made a quarter wavelength. This makes the structure one half wavelength long at frequency $f_L$.

It has been found that different plastic and rubber materials similar to those used in the transmission lines for the radial resonant elements are preferred for use in the forward transmission line 8 of FIG. 5. Metals such as aluminum or steel are best used for the rear transmission line 9 to ensure that there is a much larger vibration amplitude produced at surface 7b that radiates the sound into the transmission medium than occurs at the open surface of the rear transmission line 9. Since the resonant frequency of the element shown in FIG. 5 is controlled by the lengths and material choices of the forward transmission line 8, and the rear transmission line 9, and the thickness of the ceramic disc 1a, the diameters of the forward and rear transmission lines and the ceramic disc can be made any value desired, provided all other resonances in these structures are kept well outside the operating frequency region of $f_L$. Therefore, the transducer element can be designed to produce any reasonable conical beam angle for the acoustic radiation pattern by making the diameter of the forward transmission line 8 conform with the curve of FIG. 4.

Since the rear transmission material is usually metallic, it is an electrical conductor. Therefore, to make fabrication easier, the rear transmission line 9 can be attached to the bottom electrode of the ceramic disc 3a using conductive cement, and the electrical lead 5 can then be electrically attached to the bottom of the rear transmission line 9, as shown. The lead 5 could obviously also be attached to the ceramic directly. In a structure such as that shown in FIG. 5, the diameters of the forward transmission line 8, the rear transmission line 9, and the ceramic can all be different, but it is usually easier to assemble the transducer if all three diameters are approximately the same.

It is often desirable to have an ultrasonic transducer produce a fan shaped radiating beam. For example, in an obstacle detection system for a robot or a vehicle, a transducer with a broad horizontal radiation pattern and a narrow vertical radiation pattern is ideal because the narrow vertical angle will not detect back scatter from the road surface and the broad horizontal pattern will require fewer transducers to cover detection of objects over the desired angular azimuth. A transducer with a rectangular radiating surface will produce a fan shaped acoustic radiation pattern that is broad in the plane around the width of the radiating surface, which I will call the horizontal plane, and narrow in the plane around its length, which I will call the vertical plane. If the width and length dimensions of the radiating surface are W and L respectively, then the beam angle of the acoustic radiation pattern in the horizontal plane, which is perpendicular to the radiating surface, bisects the length and is parallel to the planes formed by the two shorter ends, will produce a beam angle that is inversely proportional to the ratio $W/\lambda_M$. The beam angle in the vertical plane which is perpendicular to the radiating surface, bisects the width and is paralleled to the planes formed by the two longer ends, will produce a beam angle that is inversely proportional to the ratio $L/\lambda_M$. The beam angle of the radiation pattern in the horizontal plane will therefore be broader than the beam angle in the vertical plane, thus producing the fan shaped beam. For a given frequency the beam angle in each plane will decrease as W and L increase, and vice versa. The relationship of beam angle to $W/\lambda_M$ and $L/\lambda_M$ is very similar to the relationship of beam angle to $D_T/\lambda_M$ shown by the curve in FIG. 4.

Figure 7:
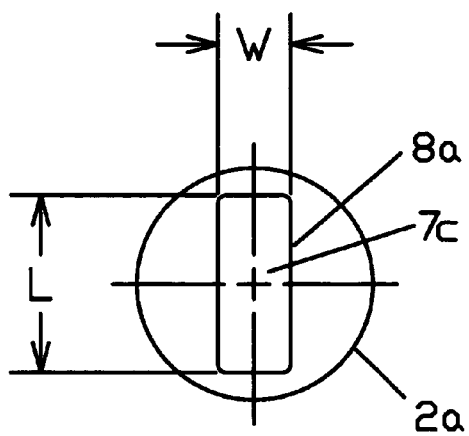
FIG. 7 is a top view of the structure shown in FIG. 6.
Figure 6:
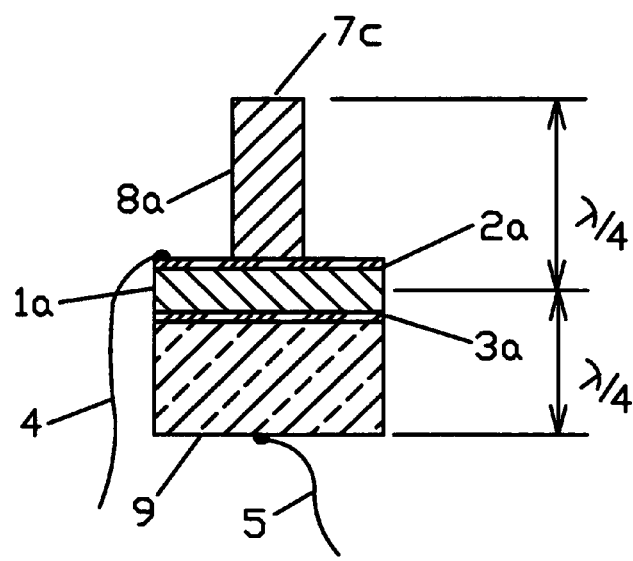
FIG. 6 is a schematic cross-sectional representation showing the half wavelength resonant structure of FIG. 5, except the acoustic transmission line for radiating sound into the medium is rectangular in shape, which enables it to produce a fan shaped acoustic radiation pattern containing one beam angle in the horizontal plane and another angle in the vertical plane.

FIG. 6 shows a cross sectional view of a modification to the resonant element structure of FIG. 5 that will produce a fan shaped radiation beam. FIG. 7 shows a top view of the structure of FIG. 6. In this embodiment the forward transmission line 8a has been shaped into a rectangular structure that is L long and W wide. The surface 7c radiates sound into the transmission medium. Typically L would be the same dimension as the diameter of the ceramic disc 1, but it can be smaller as shown. If L is equal to the ceramic diameter, the short ends of the forward transmission line 8a could form an arc that follows the circular curve of the ceramic. This would typically make the transducer easier to fabricate. Since W is smaller than L, the ratio $L/\lambda_M$ is less than the ratio $W/\lambda_M$. This will therefore produce a large beam angle for the radiation pattern in the horizontal plane around the width of the rectangular radiating surface, and a narrow beam angle in the vertical plane around its length.

Figure 9:
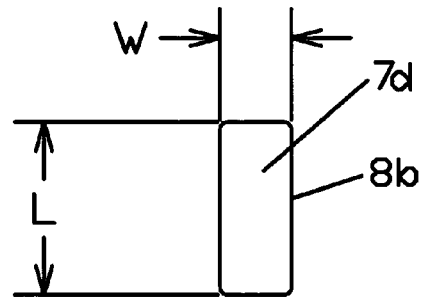
FIG. 9 is a top view of the structure shown in FIG. 8.
Figure 8:
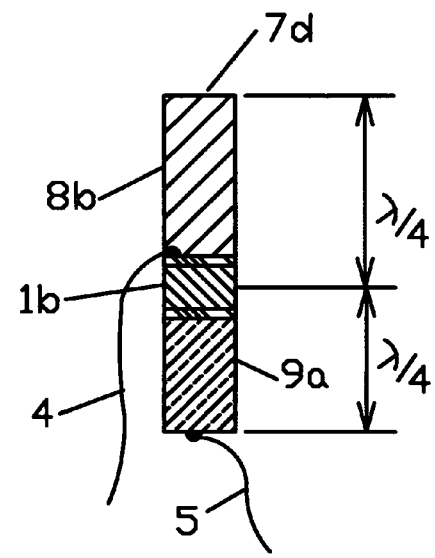
FIG. 8 is a schematic cross-sectional representation of a rectangular transducer resonant element that is a half wavelength resonator and produces a fan shaped acoustic radiation pattern.

FIG. 8 and FIG. 9 show a schematic cross-sectional and planar view of another embodiment of the resonant element structure shown in FIGS. 6 and 7, in which the front transmission line 8b, the rear transmission line 9a, and the ceramic 1b, are made rectangular. The surface 7d of the forward transmission line 8b radiates sound into the transmission medium. A structure of this nature would be a little more expensive to produce, but the transducer would also fit into a smaller size envelop.

Figure 11:
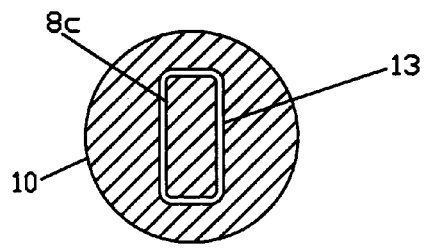
FIG. 11 is a sectional view taken along the line A-A of FIG. 10.
Figure 10:
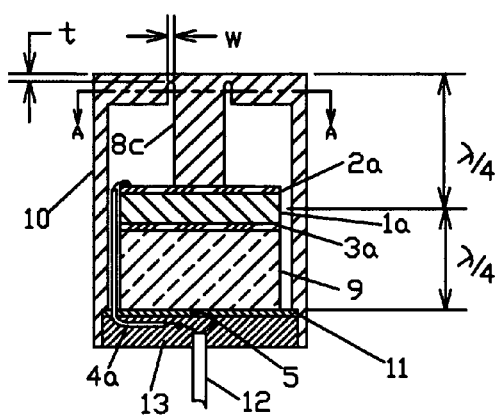
FIG. 10 is a schematic cross-sectional view of a transducer in a housing employing the teachings of this invention.

The schematic resonator element structures shown in FIGS. 1, 2, 3, 5, 6, 7, 8 and 9 illustrate how using the technology of this invention the basic resonator element design can be modified by one skilled in the art to produce transducers with different radiation patterns. However, these structures are not usable unless they can be incorporated into a housing that will allow the transducer to be protected and mounted without affecting its electroacoustic responses. FIG. 10 is a cross-section of one preference embodiment of a complete cylindrical transducer employing the teachings of this invention, and FIG. 11 is a sectional view of the structure taken along line A-A of FIG. 10. This transducer employs a similar resonator assembly to the one shown in FIGS. 6 and 7, except the forward transmission line 8c is incorporated into the transducer housing 10. The housing 10 would typically be a molded plastic piece. The length of the forward transmission line 8c plus half of the thickness of the ceramic 1a is equal to a quarter wavelength at the transducer resonant frequency, $f_L$. Likewise, the length of the metallic rear transmission line 9 plus half of the ceramic thickness is equal to a quarter wavelength at $f_L$. The top electrode of the ceramic disc 2a can be attached to the forward transmission line 8c by using any of a wide variety of cements that are commercially available. The rear transmission line 9 is also attached to the bottom electrode of the ceramic disc 3a using a commercially available cement, but in this configuration, the cement should be electrically conducting, or conducting particles should be mixed into the cement. This will allow lead 5 to be electrically attached to the rear transmission line 9 which will make it also electrically attached to electrode 3a of ceramic disc 1a. Lead 4a is electrically attached to electrode 2a of the ceramic disc 1a. It contains an insulating jacket to insure that an electrical connection cannot be inadvertently made to electrode 3a or rear transmission line 9. Leads 4a and 5 are electrically attached to each conductor of cable 12, as shown.

The structure of FIG. 10 contains a separation disc 11 which fits over the back of the resonating element structure and mounts into the shoulder in housing 10. Separation disc 11 contains holes that will allow leads 4a and 5 to pass through. It can be made from a wide variety of materials, but, it is usually best for it to be made from a material with high acoustic losses, such s certain plastics, rubbers, or corprene. The purpose of separation disc 11 is to form a dam to allow potting compound 13 to be poured into the back of the transducer while keeping it from flowing into the interior space of the transducer. After the potting compound cures, it forms a seal over the back of the transducer and also provides a strain relief for the leads 4a and 5 and the cable 12. The walls of housing 10 are made relatively thin to reduce the amount of acoustic reverberation within the structure after the transducer transmits a sound pulse.

It is necessary that the rectangular forward transmission line 8c is acoustically isolated from the rest of housing 10. This is accomplished by designing the peripheral portions of the front of housing 10 to have a large thickness to ensure that it is very stiff at the resonant frequency $f_L$. The rectangular forward transmission line 8c is disconnected from the stiff front of the housing by undercut 13. This undercut has a width w, and the thickness of the plastic in front of the undercut is t, as shown in FIG. 10. It is important that t and w be designed so that the resonance between the stiff portion of housing 10 and the resonant element is well below $f_L$, thus causing a complete mechanical decoupling of the forward transmission line 8c from the rest of housing 10 when the transducer is driven at frequency $f_L$.

If undercut 13 is properly designed, only the front portion of the housing directly in front of rectangular forward transmission line 8c will vibrate, and the rest of the front surface of the housing will be relatively stationary. The acoustic radiation pattern from the transducer will therefore be the same as that produced by the resonant element shown in FIGS. 6 and 7. If the undercut is not properly designed, there will also be motion in the rest of the front surface of the housing beyond the surface that is in the front of the rectangular forward transmission line 8c, and the radiation pattern will therefore become distorted.

Figure 12:
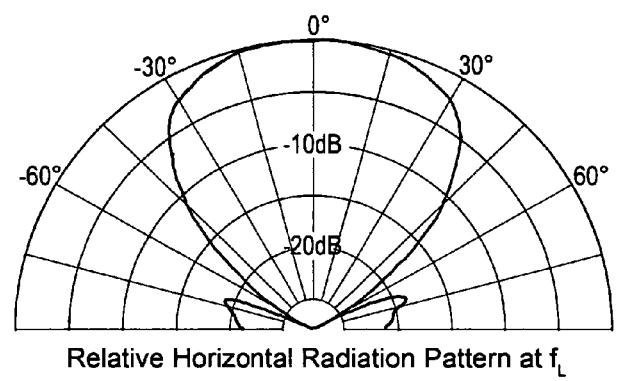
FIG. 12 is a plot showing the measured horizontal acoustic radiation pattern of a transducer similar to the structure shown in FIGS. 10 and 11.
Figure 13:
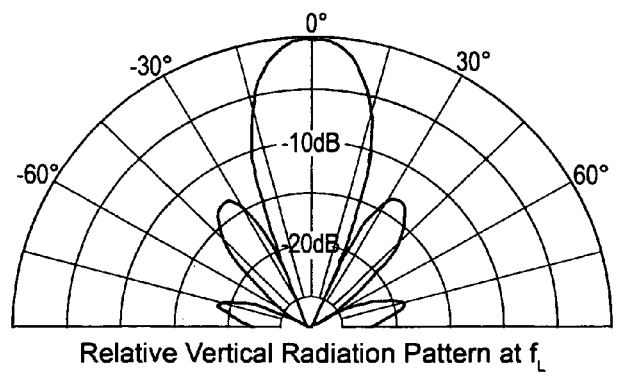
FIG. 13 is a plot showing the measured vertical acoustic radiation pattern of a transducer similar to the structure shown in FIGS. 10 and 11.

A transducer similar to the structure shown in FIG. 10 was fabricated and tested. In this unit that resonated at 62 kHz, the width and length of rectangular forward transmission line 8c were 0.2 inches wide by 0.54 inches long. The width w of undercut 13 was 0.062 inches and the thickness t was 0.012 inches. The thickness of the front of the housing beyond the area in front of transmission line 8c was 0.18 inches. The measured broad horizontal radiation pattern in the plane around the width of the forward transmission line 8c is shown in FIG. 12, and the measured narrow vertical radiation pattern in the plane around its length is shown in FIG. 13.

It is possible for anyone skilled in the art to employ the technique of this invention to design an ultrasonic transducer to operate at any desired frequency and to produce any reasonably desired acoustic radiation pattern. The transducer housing forms a continuous surface in its front portion, thus providing optimal environmental protection. This design also will be relatively unaffected by dirt attaching to the radiating surface, particularly if the resonant element is a half wavelength resonator. It is obvious to one skilled in the art that any of the resonant elements shown in FIGS. 1, 2, 3, 5, 6, 7, 8 and 9 can be substitutes for the resonator in the embodiment shown in FIGS. 10 and 11.

While a few specific embodiments of the present invention have been shown and described, it should be understood that various additional modifications and alternative constructions may be made without departing from the true spirit and scope of the invention. Therefore, the appended claims are intended to cover all such equivalent alternative construction that fall within their true spirit and scope.

I claim:

1. In combination in an electroacoustic transducer, a housing, a resonating structure, said resonating structure containing at least one piezoelectric component and at least one acoustic transmission line, electrical conducting means attached to each electrode of said piezoelectric component, said acoustic transmission line characterized in that it contains two parallel surfaces and further characterized in that the length between the two parallel surfaces is approximately ¼ wavelength in the vicinity of the frequency of resonance, $f_R$, of said resonating structure, one of the parallel surfaces is further characterized in that it is connected by attachment means to said piezoelectric component, and the other parallel surface characterized in that it is a radiating surface that is acoustically coupled to a fluid medium that is capable of transmission of acoustic energy at frequencies in the vicinity of $f_R$, that travel through said fluid medium both away from and towards said radiating surface, said radiating surface further characterized in that the length of the dimension of a line across the surface and through the center at any given angle is designed so that the ratio of the length of the line divided by the wavelength of sound in the transmission medium at a frequency in the vicinity of the resonant frequency of the resonating structure will be of the proper value to produce the desired radiating beam pattern of acoustic energy into the transmission medium in a plane characterized in that it is perpendicular to the radiating surface and further characterized in that the intersection of said plane and said radiating surface is also perpendicular to said line across the surface.

2. The invention of claim 1 characterized in that the specific acoustic impedance of said acoustic transmission line is greater than the specific acoustic impedance of the transmission medium and less than the specific acoustic impedance of said piezoelectric component.

3. The invention of claim 1 characterized in that different materials having different mechanical losses can be used for said acoustic transmission line, and further characterized in that said materials with relatively larger mechanical losses are used for said acoustic transmission line for said resonating structure to produce acoustic signals with relatively lower Qs, and materials with relatively lower mechanical losses are used for said acoustic transmission line for said resonating structure to produce acoustic signals with relatively higher Qs.

4. The invention in claim 1 characterized in that said piezoelectric component is a polarized piezoelectric ceramic disc, said piezoelectric ceramic disc further characterized in that its diameter is chosen to cause its planar radial resonant vibrational mode to produce the desired resonant frequency of said resonating structure.

5. The invention in claim 4 characterized in that the thickness of said piezoelectric ceramic disc is made small enough to ensure that the frequency of its thickness resonance is much higher than the frequency of its radial resonance.

6. The invention of claim 5 characterized in that said acoustic transmission line is cylindrical in shape, which causes said radiating beam pattern to be conical.

7. The invention of claim 6 characterized in that the diameter, $D_T$, of said acoustic transmission line is chosen so that the ratio of its diameter divided by the wavelength of sound, $\lambda_M$, in said transmission medium, $D_T/\lambda_M$, produces the desired beam angle for said radiating beam pattern, said ratio made smaller to produce a larger beam angle and made larger to produce a smaller beam angle.

8. The invention of claim 7 characterized in that said housing contains attachment means to hold said resonating structure securely into said housing with the radiating surface of said acoustic transmission line located at the front surface of said housing, said housing also characterized in that its walls are relatively thin to reduce acoustical reverberation within the structure, the peripheral portion of said front surface of the housing characterized in that it has sufficient stiffness at the frequency of resonance of said resonant structure to ensure that it has minimal motion compared to the motion of said radiating surface, and disconnection means to disconnect said radiating surface of said acoustic transmission line from the housing at the frequency of resonance to allow said radiating surface to vibrate approximately in the same manner as it would have if it was not connected to said housing.

9. In combination in an electroacoustic transducer, a housing, a resonating structure, said resonating structure containing at least one piezoelectric component having a first and second parallel plane surface, a separate electrode attached to said first and second parallel plane surfaces, a front acoustic transmission line, a rear acoustic transmission line, electrical conducting means attached to each said electrode of said piezoelectric component, said acoustic transmission lines characterized in that they each contain two parallel surfaces and further characterized in that the length between the two parallel surfaces plus half of the thickness of said piezoelectric component is approximately ¼ wavelength in the vicinity of the frequency of the length resonance, $f_L$, of said resonating structure, one of the parallel surfaces of each acoustic transmission line is further characterized in that they are connected by attachment means, one to each of said parallel plane surfaces of said piezoelectric component, and the other parallel surface of the front acoustic transmission line characterized in that it is a radiating surface that is acoustically coupled to a fluid medium that is capable of transmission of acoustic energy at frequencies in the vicinity of $f_L$, that travel through said fluid medium both away from and towards said radiating surface, said radiating surface further characterized in that the length of the dimension of a line across the surface and through the center at any given angle is designed so that the ratio of the length of the line divided by the wavelength of sound in the transmission medium at a frequency in the vicinity of the resonant frequency of the resonating structure will be of the proper value to produce the desired radiating beam pattern of acoustic energy into the transmission medium in a plane characterized in that it is perpendicular to the radiating surface and further characterized in that the intersection of said plane and said radiating surface is also perpendicular to said line across the surface.

10. The invention of claim 9 characterized in that the specific acoustic impedance of said front acoustic transmission line is greater than the specific acoustic impedance of the transmission medium and less than the specific acoustic impedance of said piezoelectric component.

11. The invention of claim 10 characterized in that the specific acoustic impedance of said rear acoustic transmission line is higher than the specific acoustic impedance of said front acoustic transmission line.

12. The invention of claim 9 characterized in that said piezoelectric component is a polarized piezoelectric ceramic disc, and also characterized in that both the said front and rear acoustic transmission lines are cylindrical in shape, and also characterized in that the diameter, $D_T$, of said front acoustic transmission line is chosen so that the ratio of its diameter divided by the wavelength of sound, $\lambda_M$, in said transmission medium, $D_T/\lambda_M$, produces the desired beam angle for said radiating beam pattern, said ratio mode smaller to produce a larger beam angle and made larger to produce a smaller beam angle.

13. The invention of claim 9 characterized in that said piezoelectric component is a polarized piezoelectric ceramic, and also characterized in that said front acoustic transmission line is rectangular in shape so that said front radiating surface produces a fan shaped acoustic radiating pattern that is broad in the horizontal plane around the width of said radiating surface and narrow in the vertical plane around the length of said radiating surface.

14. The invention of claim 13 characterized in that width, W, and the length, L, of said front acoustic transmission line are chosen so that the ratios of W and L divided by the wavelength of sound, $\lambda_M$, in said transmission medium, $W/\lambda_M$ and $L/\lambda_M$, produce the desired horizontal and vertical beam angles for said fan shape radiating beam pattern, said ratios made smaller to produce a larger beam angle and made larger to produce a smaller beam angle.

15. The invention of claim 14 characterized in that both said polarized piezoelectric ceramics and said rear acoustic transmission lines are also rectangular in shape.

16. The invention of claim 14 characterized in that said housing contains attachment means to hold said resonating structure securely into said housing with the radiating surface of said front acoustic transmission line located at the front surface of said housing, said housing also characterized in that its walls are relatively thin to reduce acoustical reverberation within the structure, the peripheral portion of said front surface of the housing characterized in that it has sufficient stiffness at the frequency of resonance of said resonant structure to ensure that it has minimal motion compared to the motion of said radiating surface, and disconnection means to disconnect said radiating surface of said acoustic transmission line from the housing at the frequency of resonance to allow said radiating surface to vibrate approximately in the same manner as it would have if it was not connected to said housing.

17. The invention of claim 16 characterized in that said electroacoustic transducer contains a clamping pod, said clamping pod characterized in that it is made from a material containing high acoustic losses, and attachment means for securing said clamping pod to the parallel surface of said rear acoustic transmission line that is not attached to said piezoelectric ceramic.

18. The invention of claim 16 characterized in that said housing contains sealing means, said sealing means characterized in that it provides environmental protection for the said resonating structure, said sealing means further characterized in that means are provided to allow electrical connections to said electrical conducting means from the exterior of said housing.

* * * * *